United States Patent [19]

Johnston

[11] 4,132,068
[45] Jan. 2, 1979

[54] VARIABLE AREA EXHAUST NOZZLE

[75] Inventor: Everett A. Johnston, Mason, Ohio

[73] Assignee: The United States of America as represented by the United States National Aeronautics and Space Administration, Washington, D.C.

[21] Appl. No.: 573,029

[22] Filed: Apr. 30, 1975

[51] Int. Cl.² .......................... B64C 15/06; F02K 3/06
[52] U.S. Cl. ............................... 60/226 A; 239/265.39
[58] Field of Search .................... 60/226 A, 228, 230, 60/242, 271; 239/265.33, 265.37, 265.39, 265.41, 265.43, 503, 507; 137/15.1, 15.2; 251/212; 138/109; 244/110 B, 12 D

[56] References Cited

U.S. PATENT DOCUMENTS

| 3,703,258 | 11/1972 | Wildner | 239/265.39 |
| 3,747,341 | 7/1973 | Davis | 60/226 A |
| 3,820,719 | 6/1974 | Clark | 60/226 A X |
| 3,873,027 | 3/1975 | Camboulives et al. | 239/265.33 |
| 3,892,358 | 7/1975 | Gisslen | 239/265.39 |

Primary Examiner—C. J. Husar
Assistant Examiner—Thomas I. Ross
Attorney, Agent, or Firm—Norman T. Musial; Dana F. Bigelow; Derek P. Lawrence

[57] ABSTRACT

A variable area exhaust nozzle for a gas turbine engine comprising a plurality of arcuate flaps pivotally connected to the trailing edge of a cylindrical casing which houses the engine is provided with seals disposed within the flaps along the side edges thereof. The seals are spring biased and extensible beyond the side edges of the flaps. The seals of adjacent flaps are maintained in sealing engagement with each other when the flaps are adjusted between positions defining minimum nozzle flow area and the cruise position. Extensible, spring biased seals are also disposed within the flaps adjacent to a supporting pylon to thereby engage the pylon in a sealing arrangement. The flaps are hinged to the casing at the central portion of the flaps' leading edges and are connected to actuators at opposed outer portions of the leading edges to thereby maximize the mechanical advantage in the actuation of the flaps.

9 Claims, 12 Drawing Figures

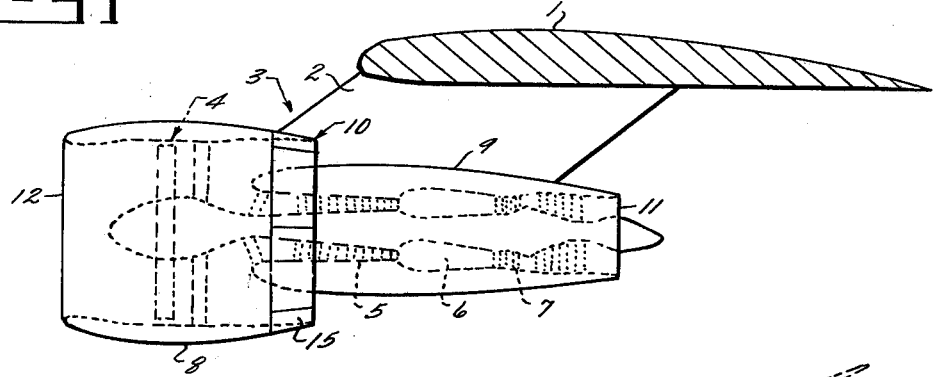
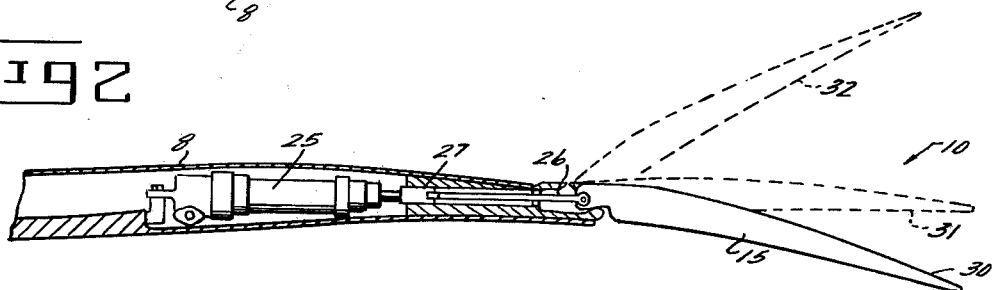
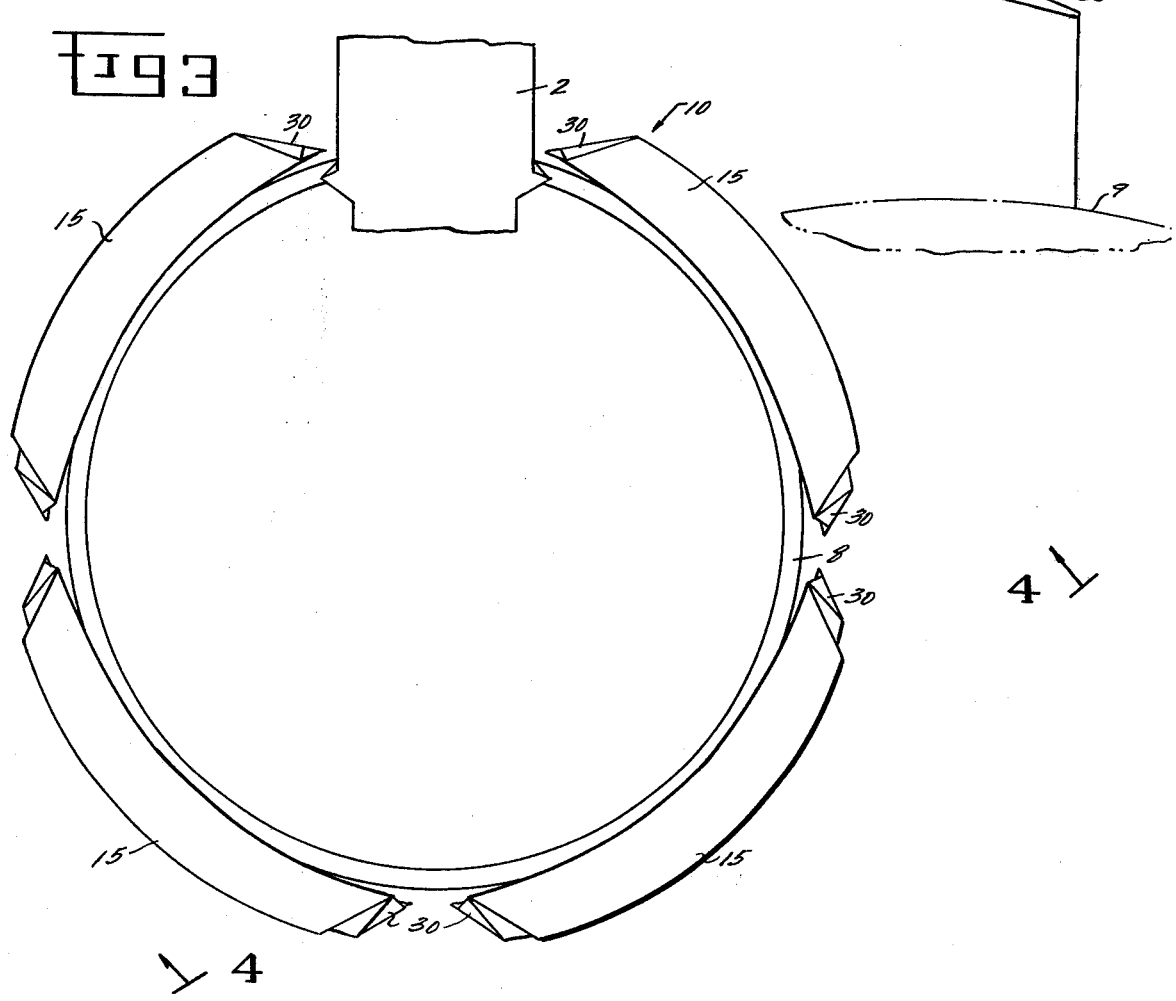

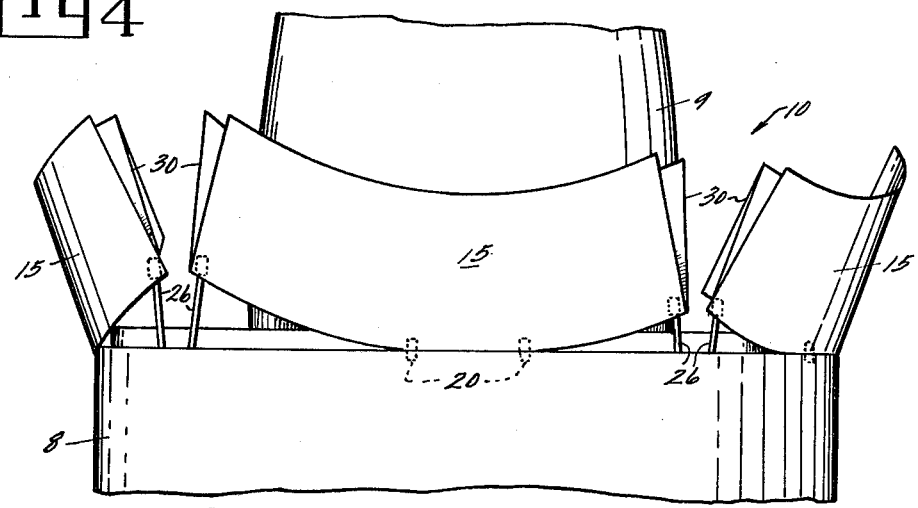
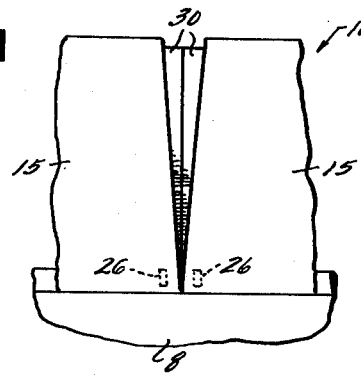
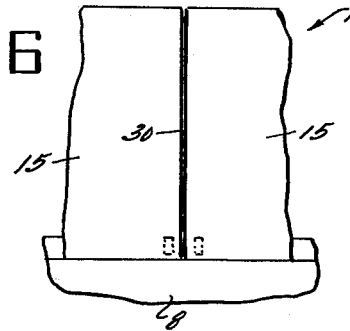
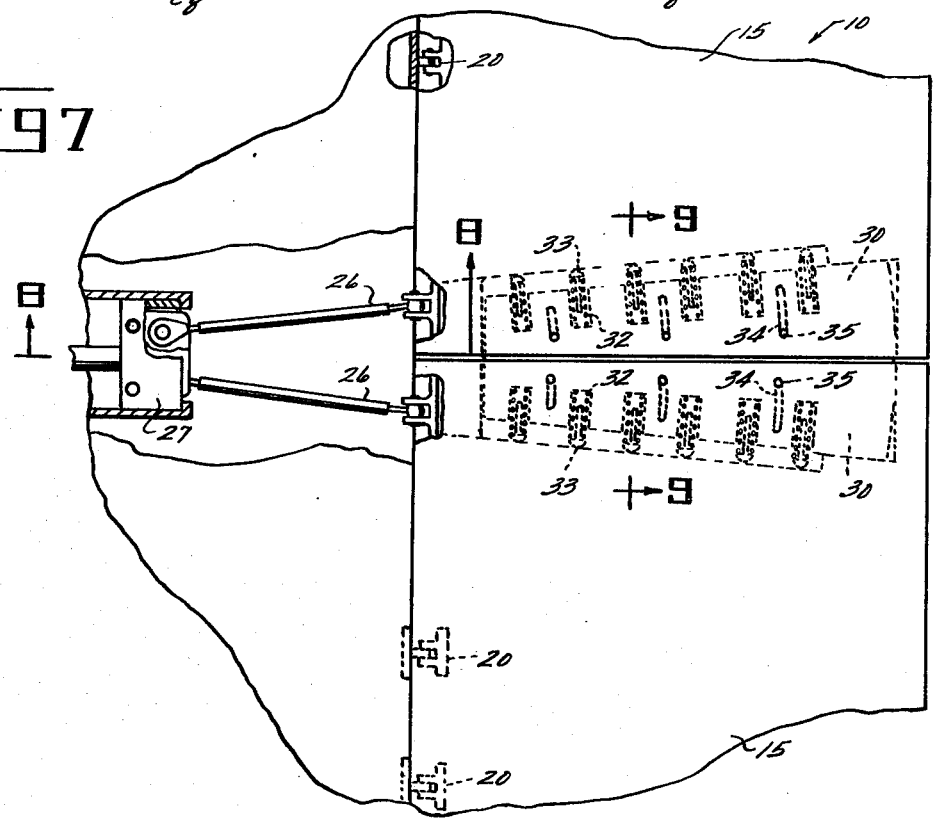

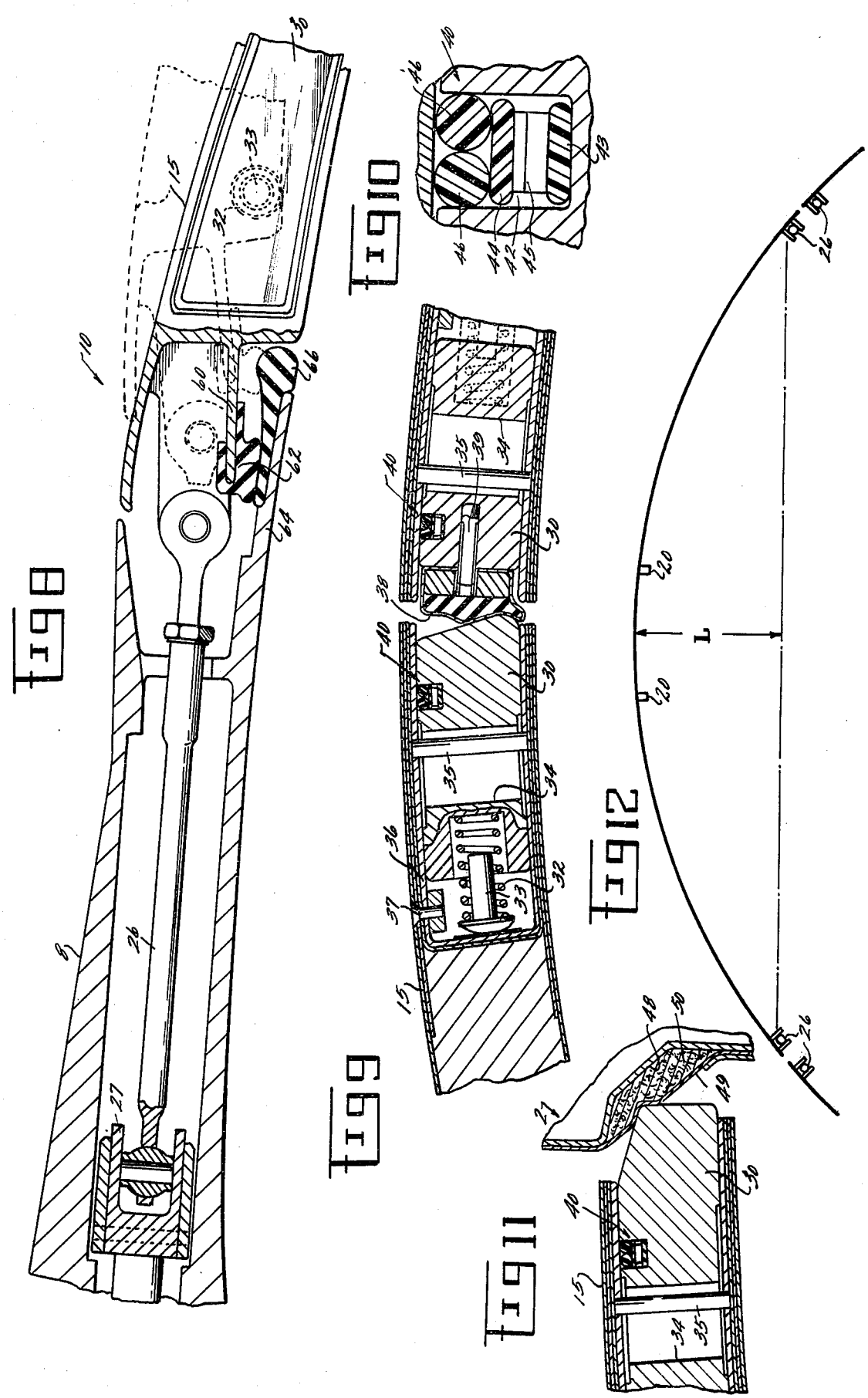

VARIABLE AREA EXHAUST NOZZLE

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to variable area exhaust nozzles for gas turbine engines and, more particularly, to variable area exhaust nozzles which act as air inlets when the engine is operated in a reverse thrust mode.

The exhaust nozzle of a gas turbine engine, such as a turbojet or turbofan engine, has as its purpose the transformation of the pressure and thermal energy of the combustion discharge or exhaust gases into velocity, the forward thrust of the engine being directly proportional to the increase in velocity of the gas from the entrance of the engine to the exit plane of the nozzle. It has been found desirable to permit variation of nozzle flow area to maintain a high engine performance under a wide range of operating conditions. For example, it may be desirable to provide a larger nozzle flow area during a take-off mode of operation than during a cruise mode. One means for varying the nozzle flow area is by the use of a plurality of movable members or flaps pivotally supported about the nozzle axis. One of the problems associated with use of a plurality of flaps concentrically arranged about the engine axis has been the need to maintain effective seals between the flaps as the flaps are adjusted to vary the nozzle flow area so as to optimize the nozzle performance throughout various modes of engine operation. Therefore, it is desirable to provide a smooth transition or seal between the side edges of the flaps making the exhaust nozzle aerodynamic in shape and efficient in its operation.

Thrust reversers are devices which redirect the exhaust gas flow from the gas turbine engine in a direction opposed to that of the exhaust gas flow during normal operation. Reversible variable pitch fan jet engines operate in a thrust reversal mode by reversing the flow of air through a fan duct so that the engine inlet becomes the exhaust duct and the fan exhaust duct becomes the engine inlet. Since fan exhaust nozzles are normally sized to accelerate the gas flow to high velocities prior to exiting, when used as an inlet during a reverse thrust mode of operation, the flow area of the nozzle is too small to allow the required large volumes of air to enter at the required low velocity flow rate. Therefore, it is desirable to provide exhaust nozzle flaps which may be opened wider than normal to define a nozzle flow area of sufficient magnitude to enable the nozzle to effectively operate as an inlet in a reverse thrust mode operation. However, the actuation or positioning of flaps of sufficient size may require a large number of actuators or actuators of high power ratings unless a sufficient mechanical advantage is provided for between the actuators and the flap mounting means.

It is therefore an object of this invention to provide an improved variable area exhaust nozzle for a gas turbine engine wherein adjacent flaps employed therein are maintained in a sealed arrangement making the nozzle aerodynamic in shape and efficient in its operation.

Another object of this invention is to provide an improved variable area exhaust nozzle wherein a mechanical advantage between the actuators and the hinges is achieved when the nozzle flaps are adjusted.

SUMMARY OF THE INVENTION

Briefly, in accordance with one aspect of the invention, these objects are attained by providing a variable area exhaust nozzle comprising a plurality of arcuate flaps pivotally connected to the trailing edge of a gas turbine engine casing. Actuator means are provided for positioning the flaps to vary the flow area of the nozzle. Extensible seals are provided within the interior of the flaps along side edge portions thereof and are spring biased outwardly, the seals of adjacent flaps being maintained in a sealing engagement with each other during all modes of forward thrust engine operation. The flaps adjacent to a supporting pylon are also provided with spring biased extensible seals to seal the side edges of those flaps with the pylon.

In accordance with another aspect of the invention, the flaps are capable of opening wide enough to provide sufficient inlet flow area when the engine is operated in a reverse thrust mode. They are hinged at the central portion of their leading edges and are connected to the actuators at the extremities of their leading edges such that the actuators interact with the centrally located hinges to achieve a substantial mechanical advantage in the opening of the flaps.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is an overall view of a gas turbine engine employing the exhaust nozzle of the present invention;

FIG. 2 is a partially sectioned side view of a portion of the exhaust nozzle of the present invention showing the cruise, take-off and reverse thrust positions of a flap employed therein;

FIG. 3 is a rear view of the exhaust nozzle of the present invention with the flaps employed therein in a fully open position;

FIG. 4 is a top view, taken on line 4—4 of FIG. 3, of the exhaust nozzle of the present invention with flaps employed therein in a fully opened position;

FIG. 5 is a fragmentary view of adjacent flaps of the present invention and the seals associated therewith shown in a take-off position;

FIG. 6 is a fragmentary view of adjacent flaps of the present invention and the seals associated therewith shown in a cruise position;

FIG. 7 is a fragmentary side view of two adjacent flaps employed in the nozzle of the present invention partially broken away to show connections between the flaps and actuators employed therewith;

FIG. 8 is a sectional view of a portion of the exhaust nozzle of the present invention taken along line 8—8 of FIG. 7;

FIG. 9 is a sectional view of the exhaust nozzle of the present invention taken along line 9—9 of FIG. 7;

FIG. 10 is an enlarged fragmentary view of a portion of the seal shown in FIG. 9;

FIG. 11 is an enlarged fragmentary end view in cross section of a pylon to which the engine is mounted and an adjacent flap and seal employed therewith; and FIG. 12 is a schematic rear view of a flap employed in the nozzle of the present invention showing connection points of hinges and actuators.

DESCRIPTION OF THE PREFERRED EMBODIMENT

Referring to FIG. 1 there is shown an aircraft wing 1 to which is fixed a pylon 2 supporting a gas turbine engine 3 of the turbofan type. The gas turbine engine includes a fan stage 4, compressor stage 5, combustor 6 and turbine 7. The engine is provided with an outer casing or nacelle 8 and a core engine casing 9. A fan exhaust nozzle 10 is fixed to the trailing edge portion of the nacelle and an exhaust nozzle 11 defines the trailing edge portion of the core engine casing 9. The variable area exhaust nozzle of the present invention will be described in terms of use with the nacelle 8, but it should be understood that its application should not be so limited. For example, the variable area exhaust nozzle of the present invention may be adapted for use with the core engine casing as shown at 11.

When used in a turbofan engine during periods of reverse thrust operation, air enters the nacelle at 10 instead of at the inlet 12 and provision must therefore be made for an increase in air flow volume during that period. The variable area exhaust nozzle of the present invention is thus adjustable to provide the optimum nozzle flow area under both conditions of forward and reverse thrust as will be shown hereinafter.

Referring now to FIGS. 2-8, there is shown a fan exhaust nozzle 10 comprising four arcuate flaps 15 pivotally attached at the central portion of their leading edges to the nacelle 8 by hinges 20 (FIG. 4). Flaps 15 are positioned by actuators (one of which is shown at 25 of FIG. 2) fixed within the nacelle 8. The flaps 15 are connected to the actuator 25 through links 26 and sliders 27, the links 26 being attached at opposed outer portions of the flaps 15 leading edges (see FIGS. 4 and 7). This particular configuration of arcuate flaps hinged at the central portion of their leading edges and connected to the actuators at opposed outer portions of the leading edges is advantageous for two reasons. Since all the flaps are connected to the actuators at outer portions of their leading edges, it can be seen that any two adjacent flaps will have connection points to actuators in close proximity to each other and, may therefore be operated by a single actuator (see FIG. 7). Therefore, an economy of structure is achieved where no pylon is interposed between flaps in that all four flaps, though each is connected to actuators at two points, may be actuated by only four actuators. Where a pylon is interposed between two flaps, the flaps are necessarily spaced a relatively large distance apart, as shown in FIG. 3, and it may be necessary to employ separate actuators for each flap edge disposed adjacent the pylon. However, even with this arrangement, it is only necessary to employ a maximum of five actuators to operate four flaps.

Where a split cowl concept is employed, an additional actuator is required. In such a design for an under-the-wing engine installation, the outer cowl is split along the bottom centerline with each half cowl being hinged along its top edge to the pylon. To accommodate the bottom split, it is thus necessary to have one actuator on each side of the split rather than a single actuator at that point. Therefore, where a pylon is interposed at the top, and a split is made in the cowl at the bottom, the total number of actuators would be six.

Since it is desirable to have the movement of all the flaps sychronized during engine operation, this can be accomplished by any known method as for example by way of a synchronization cable interconnecting the individual actuator systems.

Another important advantage of the present actuator placement is that each flap is provided with a connection to an actuator at an outer portion of the flap's leading edge. As can be seen from FIG. 2, each flap must be adjustable through a wide range of positions. For example, the flap 15 is shown in a cruise position 30 (solid lines), a take-off position 31 and a thrust reverse position 32 (dotted lines). By providing the present hinge and actuator connection assembly, a large variation in flap positions is made possible. As can be seen from FIG. 12, this particular arrangement of hinging and connection to the actuators provides a mechanical advantage between the actuators and the hinges characterized by a moment arm of length L. Thus, by taking advantage of the curvature of the flap the wide range of flap positions necessitated by the operation of the engine in modes of cruise, take-off and thrust reverse may be accomplished by an actuator capable of exerting less force than that of an actuator connected in a conventional manner.

To ensure the efficiency of the nozzle, seal elements are provided for sealing spaces between flaps during all modes of forward thrust engine operation. Referring now to FIGS. 5 and 6, there are shown two adjacent flaps positioned for a take-off mode of operation (FIG. 5) and a cruise mode of operation (FIG. 6). Disposed within each flap along the side edge thereof is a sliding seal member 30, the sliding seal members of adjacent side edges of adjacent flaps being biased into a sealing engagement with each other when the flaps are positioned for forward thrust modes of operation. Should the flaps be positioned for a cruise mode of operation (minimum nozzle flow area), sliding seal members 30 are automatically pushed into the flaps which house them such that the flaps themselves seal with each other (FIG. 6). As shown in FIG. 4, when the flaps are opened as far as possible for a reverse thrust mode of operation, no sealing between the flaps is desired since the nozzle in this mode acts as an air inlet. However, when the flaps are set for a minimum reverse thrust nozzle area, the sliding seal members engage each other at forward portions of the sides thereof to ensure a smooth re-engagement of the members when changing the position of the flaps from this thrust reverse configuration to a forward thrust configuration.

The details of the seals are shown in FIGS. 9 and 10. Each flap 15 is provided along each side edge thereof with a sliding seal member 30 disposed therewithin and biased outwardly by springs 32. (See FIGS. 7 and 9.) Spring guides 33 disposed within springs 32 maintain the alignment of the springs with the sliding seal member. Each sliding seal member 30 is provided with a plurality of slots 34 in each of which is disposed a pin 35 which is stationary with respect to the flap 15. Pins 35 act to maintain the alignment of the sliding seal member 30 with the flap and at the same time limit the outward movement of that member by their engagement with the ends of slots 34. Referring to FIG. 9, the entire seal means may be assembled in a housing 36 outside of the flap and mounted therewithin by rivets one of which is shown at 37 or any other suitable fastening means. One of two mating seals is provided with a compressible bumper 38 fixed to the outer edge portion of sliding seal member 30 by pin 39 or other suitable fastening means.

This compressible bumper ensures an effective seal with the mating edge of an opposed sliding seal member.

To prevent any overboard leakage of any gas from the nozzle exhaust duct which may make its way around the back side of the sliding member 30, an axial seal 40 is disposed within a groove 42 provided in the outer portion of sliding seal member 30. Referring to FIG. 10, there is shown disposed within groove 42 inner and outer bearing strips 43 and 44, respectively, urged apart by wave spring 45. As shown in FIG. 10, the inner bearing strip 43 engages the bottom of groove 42 and the outer bearing strip engages cylindrical sealing members 46 which maintain a movable seal between sliding seal member 30 and housing 36. Therefore, it can be seen that axial seal 40 prevents any flow of air between sliding seal member 30 and the inner surface of the flap.

As shown in FIG. 3, two of the flaps are disposed along faces of pylon 2 and, for efficient operation, must be sealed therewith. Referring now to FIG. 11, each of the flaps disposed adjacent pylon 2 is provided with a sealing means for engagement with the pylon substantially the same as that shown in FIG. 9, although no flexible bumper is employed with the sliding seal member 30 employed to seal the flap with the pylon. Moreover, as shown in FIG. 11, the pylon 2 is provided in recesses 48, with an elastic skin 49 overlying a compressible material 50 (disposed within recess 48) to effectively maintain with sliding seal member 30 a seal between the flaps and the pylon.

Referring finally to FIG. 8, it can be seen that each flap 15 is provided with a forwardly projecting tongue 60 to which is fixed an elastic slider 62. Outer casing 8 is provided with a rearwardly projecting tongue 64 to which is fixed a ramp seal member 66. Slider 62 and ramp seal member 66 provide a seal to effectively block any flow of air between casing 8 and flap 15. The sliding engagement of slider 62 with ramp seal 66 ensures that the sealing engagement of these two members will be maintained in all operational positions of the flaps.

In operation, when the exhaust nozzle of the present invention is adjusted for a cruise mode of engine operation, as shown at 30 in FIG. 2, the edges of adjacent flaps provide the sealing therebetween as shown in FIG. 6. Opening the flaps to a position corresponding to a take-off mode of engine operation causes springs 32 to urge sliding seal members 30 toward an adjacent flap, engaging an opposed sliding seal member along bumper 38 as shown in FIGS. 5 and 9. When the flaps are adjusted for reverse thrust as shown in FIGS. 3 and 4, no sealing is desired. The sliding seal members 30 are urged outwardly but make no sealing engagement with each other.

It can be seen then that the variable area exhaust nozzle of the present invention is capable of being adjusted to optimum positions for modes of gas turbine engine operation of take-off, cruise and thrust reversal. The nozzle of the present invention is characterized by its simplicity of construction and economy of manufacture due to the relative positioning of the actuators and the connection points of the flaps to the actuators. Where four flaps are employed in the variable area nozzle of the present invention the connection of the flaps to the actuators may be maintained at two opposed points of the leading edge of the flaps yet requiring only four or five actuators (depending on the provision of a pylon) for the positioning of these flaps. Moreover, locating the points where the flaps are hinged to the engine casing at the central portion of the leading edges of the flaps makes possible a substantial mechanical advantage in the actuation of the flaps by taking advantage of the flap curvature. Therefore, it is not necessary to employ actuators of high power capabilities to effectively position the flaps through wide ranges from a fully open position for thrust reversal to positions defining minimum nozzle flow area for a cruise mode of operation.

The seal means disposed within the side edges of the flaps maintain sealing between the flaps or between the flaps and an adjacent pylon during all modes of forward thrust engine operation while optimizing the nozzle's efficiency.

Modifications of the apparatus may be employed by those skilled in the art without departing from this invention and it is intended by the appended claims to cover such modifications.

What is claimed as novel and desired to be secured by Letters Patent of the United States is:

1. In a gas turbine engine housed within a generally cylindrical casing, a variable area exhaust nozzle comprising:
    a plurality of arcuate flaps pivotally connected to the trailing edge of said casing;
    actuator means connected to said flaps for positioning said flaps to vary the flow area through said nozzle and
    seal elements disposed within said flaps along the side edges thereof, said seal elements of adjacent flaps being biased outwardly beyond the side edges of said flaps, to mutually maintain sealing engagement when said flaps are within a predetermined range of positions and to interrupt sealing engagement when said flaps are outside of said predetermined range of positions.

2. The variable exhaust nozzle of claim 1 and including a compressible bumper element attached to one of said seal elements and compressibly engageable with the adjacent seal element.

3. The variable area exhaust nozzle of claim 1 wherein each of said extensible seal elements includes:
    spring means engaging said seal element and urging said seal element outwardly from the side edge of said flap; and
    guide means for maintaining the alignment of said flap and said seal element as said seal element is urged outwardly by said spring means.

4. The variable area exhaust nozzle of claim 3 wherein said seal element has a slot disposed therein and said guide means comprises a pin disposed within said slot and fixed to the interior of said flap, said seal element being slideably movable with respect to said pin.

5. The variable area exhaust nozzle of claim 1 wherein said seal element is provided with a longitudinal groove in the outer surface thereof and at least one cylindrical sealing member rotatably disposed within said longitudinal groove and engaging the inner surface of said flap for preventing any flow of air between the flap and said seal element.

6. The variable area exhaust nozzle of claim 5 and including inner and outer bearing strips disposed within said longitudinal groove beneath said cylindrical sealing member, said outer bearing strip being in engagement with said cylindrical sealing member and a spring disposed within said longitudinal groove between said bearing strips for urging said bearing strips apart and said cylindrical sealing member into sealing engagement with the inner surface of said flap.

7. The variable area exhaust nozzle of claim 1 further including hinge means disposed approximately at the central portion of the leading edge of each of said flaps and said actuator means are connected to said flaps at opposed outer portions of the leading edges thereof for achieving a mechanical advantage in the actuation of said flaps.

8. In a gas turbine engine housed within a generally cylindrical casing and mounted to an airframe by a pylon, a variable area exhaust nozzle comprising:

a plurality of arcuate flaps pivotally connected to the trailing edge of said casing, actuator means connected to said flaps for positioning said flaps to vary the flow area through said nozzle and seal means disposed within said flaps along the side edges thereof, said seal means being biased outwardly to beyond the side edges of said flaps, the seal means of flaps adjacent said pylon being brought into sealing engagement with said pylon when said flaps are within a predetermined range of positions and in sealing disengagement when said flaps are outside of said predetermined range of positions.

9. The variable area exhaust nozzle of claim 8 wherein said pylon on opposite sides thereof is provided with compressible material for sealing engagement with said seal means.

* * * * *